US008831111B2

(12) United States Patent
Au et al.

(10) Patent No.: US 8,831,111 B2
(45) Date of Patent: Sep. 9, 2014

(54) DECODING WITH EMBEDDED DENOISING

(75) Inventors: Oscar Chi Lim Au, Hong Kong (CN); Liwei Guo, Hong Kong (CN); Hon Wah Wong, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1287 days.

(21) Appl. No.: 12/122,163

(22) Filed: May 16, 2008

(65) Prior Publication Data
US 2008/0285655 A1 Nov. 20, 2008

Related U.S. Application Data

(63) Continuation-in-part of application No. 11/750,498, filed on May 18, 2007, now Pat. No. 8,369,417.

(60) Provisional application No. 60/931,759, filed on May 29, 2007, provisional application No. 60/801,375, filed on May 19, 2006.

(51) Int. Cl.
*H04N 7/12* (2006.01)
*H04N 7/36* (2006.01)
*H04N 7/26* (2006.01)

(52) U.S. Cl.
CPC .... *H04N 19/00733* (2013.01); *H04N 19/00587* (2013.01); *H04N 19/00533* (2013.01); *H04N 19/0089* (2013.01); *H04N 19/00721* (2013.01)
USPC .................................................. 375/240.29

(58) Field of Classification Search
None
See application file for complete search history.

(56) References Cited

U.S. PATENT DOCUMENTS

| | | | | |
|---|---|---|---|---|
| 4,903,128 | A | | 2/1990 | Thoreau |
| 5,150,432 | A | * | 9/1992 | Ueno et al. ..................... 382/250 |
| 5,497,777 | A | | 3/1996 | Abdel-Malek et al. |
| 5,781,144 | A | | 7/1998 | Hwa |
| 5,819,035 | A | | 10/1998 | Devaney et al. |
| 5,831,677 | A | | 11/1998 | Streater |
| 5,889,562 | A | | 3/1999 | Pau |
| 5,982,432 | A | * | 11/1999 | Uenoyama et al. ...... 375/240.01 |
| 6,023,295 | A | | 2/2000 | Pau |

(Continued)

FOREIGN PATENT DOCUMENTS

| | | |
|---|---|---|
| EP | 0797353 A1 | 9/1997 |
| EP | 1040666 B1 | 10/2000 |
| EP | 1239679 A2 | 9/2002 |
| EP | 1711019 A2 | 10/2006 |

OTHER PUBLICATIONS

Office Action mailed Jun. 29, 2011 for U.S. Appl. No. 11/750,498, 25 pages.

(Continued)

*Primary Examiner* — Ayaz Sheikh
*Assistant Examiner* — Faiyazkhan Ghafoerkhan
(74) *Attorney, Agent, or Firm* — Amin, Turocy & Watson, LLP

(57) ABSTRACT

Methods and systems for denoising embedded digital video decoding. Prediction and residue block of a current frame are obtained from motion vector. Variance of residue block is calculated using prior reference blocks, and a causal temporal linear minimum square error estimator is used to calculate a filter coefficient. The residue block is modified using the filter coefficient, and an output digital bitstream of blocks of pixels of the current frame is produced using the modified residue block and prior denoised prediction value of prior frames.

20 Claims, 12 Drawing Sheets

(56) References Cited

U.S. PATENT DOCUMENTS

| | | | |
|---|---|---|---|
| 6,090,051 A | 7/2000 | Marshall | |
| 6,094,453 A | 7/2000 | Gosselin et al. | |
| 6,101,289 A | 8/2000 | Kellner | |
| 6,178,205 B1 * | 1/2001 | Cheung et al. | 375/240.29 |
| 6,182,018 B1 | 1/2001 | Tran et al. | |
| 6,211,515 B1 | 4/2001 | Chen et al. | |
| 6,249,749 B1 | 6/2001 | Tran et al. | |
| 6,285,710 B1 | 9/2001 | Hurst et al. | |
| 6,343,097 B2 * | 1/2002 | Kobayashi et al. | 375/240 |
| 6,346,124 B1 | 2/2002 | Geiser et al. | |
| 6,424,960 B1 | 7/2002 | Lee et al. | |
| 6,442,201 B2 * | 8/2002 | Choi | 375/240.12 |
| 6,443,895 B1 | 9/2002 | Adam et al. | |
| 6,470,097 B1 | 10/2002 | Lai et al. | |
| 6,499,045 B1 | 12/2002 | Turney et al. | |
| 6,557,103 B1 | 4/2003 | Boncelet, Jr. et al. | |
| 6,594,391 B1 | 7/2003 | Quadranti et al. | |
| 6,633,683 B1 | 10/2003 | Dinh et al. | |
| 6,650,779 B2 | 11/2003 | Vachtesvanos et al. | |
| 6,684,235 B1 | 1/2004 | Turney et al. | |
| 6,700,933 B1 * | 3/2004 | Wu et al. | 375/240.16 |
| 6,716,175 B2 | 4/2004 | Geiser et al. | |
| 6,771,690 B2 * | 8/2004 | Heikkila | 375/147 |
| 6,792,044 B2 | 9/2004 | Peng et al. | |
| 6,799,141 B1 | 9/2004 | Stoustrup et al. | |
| 6,799,170 B2 | 9/2004 | Lee et al. | |
| 6,801,672 B1 | 10/2004 | Thomas | |
| 6,827,695 B2 | 12/2004 | Palazzolo et al. | |
| 6,836,569 B2 | 12/2004 | Le Pennec et al. | |
| 6,840,107 B2 | 1/2005 | Gan | |
| 6,873,368 B1 | 3/2005 | Yu et al. | |
| 6,876,771 B2 | 4/2005 | Prakash et al. | |
| 6,904,096 B2 | 6/2005 | Kobayashi et al. | |
| 6,937,765 B2 | 8/2005 | Skourikhine et al. | |
| 6,944,590 B2 | 9/2005 | Deng et al. | |
| 6,950,042 B2 | 9/2005 | Nakagawa et al. | |
| 6,950,473 B2 * | 9/2005 | Kim et al. | 375/240.29 |
| RE39,039 E | 3/2006 | Ro et al. | |
| 7,034,892 B2 * | 4/2006 | Ojo et al. | 348/607 |
| 7,110,455 B2 | 9/2006 | Wu et al. | |
| 7,120,197 B2 * | 10/2006 | Lin et al. | 375/240.29 |
| 7,167,884 B2 | 1/2007 | Picciolo et al. | |
| 7,197,074 B2 | 3/2007 | Biswas et al. | |
| 7,363,221 B2 * | 4/2008 | Droppo et al. | 704/226 |
| 7,369,181 B2 * | 5/2008 | Kang et al. | 348/606 |
| 7,379,501 B2 * | 5/2008 | Lainema | 375/240.29 |
| 7,869,500 B2 * | 1/2011 | Yankilevich | 375/240.01 |
| 7,911,538 B2 | 3/2011 | Ha et al. | |
| 8,009,732 B2 * | 8/2011 | Bhaskaran | 375/240.12 |
| 8,050,331 B2 * | 11/2011 | Lelescu et al. | 375/240.29 |
| 8,259,804 B2 * | 9/2012 | Lu | 375/240.14 |
| 2002/0024999 A1 | 2/2002 | Yamaguchi et al. | |
| 2004/0081240 A1 * | 4/2004 | Chen et al. | 375/240.16 |
| 2005/0025244 A1 | 2/2005 | Lee et al. | |
| 2005/0135698 A1 | 6/2005 | Yatsenko et al. | |
| 2005/0280739 A1 | 12/2005 | Lin et al. | |
| 2006/0228027 A1 | 10/2006 | Matsugu et al. | |
| 2006/0262860 A1 | 11/2006 | Chou et al. | |
| 2006/0290821 A1 | 12/2006 | Souplioits et al. | |
| 2007/0053441 A1 | 3/2007 | Wang et al. | |
| 2007/0110159 A1 | 5/2007 | Wang et al. | |
| 2007/0126611 A1 | 6/2007 | Streater | |
| 2007/0140587 A1 | 6/2007 | Wong et al. | |
| 2007/0171974 A1 | 7/2007 | Baik | |
| 2007/0177817 A1 | 8/2007 | Szeliski et al. | |
| 2007/0195199 A1 | 8/2007 | Chen et al. | |
| 2007/0257988 A1 | 11/2007 | Ong et al. | |
| 2008/0056366 A1 * | 3/2008 | Bhaskaran | 375/240.16 |
| 2008/0151101 A1 | 6/2008 | Tian et al. | |
| 2008/0292005 A1 | 11/2008 | Xu et al. | |
| 2010/0014591 A1 | 1/2010 | Suzuki | |
| 2010/0220939 A1 | 9/2010 | Tourapis et al. | |

OTHER PUBLICATIONS

Song, et al. "Motion-Compensated Temporal Filtering for Denoising in Video Encoder", Electronics Letters, Jun. 24, 2004, vol. 40, No. 13, pp. 1-2.

Cheong, et al. "Adaptive Spatio-Temporal Filtering for Video De-Noising", 2004, International Conference on Image Processing, pp. 965-968.

Kwon, et al. "A Motion-Adaptive De-Interlacing Method", Aug. 1992, IEEE Transactions on Consumer Electronics, vol. 38, No. 3, pp. 145-150.

Girod. "Why B-Pictures Work: A Theory of Multi-Hypothesis Motion-Compensated Prediction", 1998, IEEE, pp. 213-217.

Braspenning, et al., "True-Motion Estimation using Feature Correspondeces", Philips Research Laboratories, 1997.

* cited by examiner

DECODING WITH EMBEDDED DENOISING

CROSS-REFERENCE TO OTHER APPLICATIONS

This is a Continuation In Part application to U.S. application Ser. No. 11/750,498 titled "Optimal Denoising for Video Coding" filed May 18, 2007. Priority is claimed from U.S. Provisional Application No. 60/931,759, filed on May 29, 2007 and U.S. application Ser. No. 11/750,498 filed on May 18, 2007, and also from U.S. Provisional Application No. 60/801,375, filed on May 19, 2006; all of which are hereby incorporated by reference. These applications may be related to the present application, or may merely have some drawings and/or disclosure in common.

BACKGROUND

The present application relates to digital signal processing, more particularly to video compression, encoding, decoding, filtering and optimal decoding and denoising, and the related devices and computer software programs thereof.

Note that the points discussed below may reflect the hindsight gained from the disclosed inventions, and are not necessarily admitted to be prior art.

Digital data processing is growingly intimately involved in people's daily life. Due to the space and bandwidth limitations in many applications, raw multimedia data often need to be encoded and compressed for digital transmission or storage while preserving good qualities.

For example, a video camera's analogue-to-digital converter (ADC) converts its analogue signals into digital signals, which are then passed through a video compressor for digital transmission or storage. A receiving device runs the signal through a video decompressor, then a digital-to-analogue converter (DAC) for analogue display. For example, MPEG-2 standard encoding/decoding can compress ~2 hours of video data by 15 to 30 times while still producing a picture quality that is generally considered high quality for standard-definition video.

Most encoding processes are lossy in order to make the compressed files small enough to be readily transmitted across networks and stored on relatively expensive media although lossless processes for the purposes of increase in quality are also available.

A common measure of objective visual quality is to calculate the peak signal-to-noise ratio (PSNR), defined as:

$$PSNR = 20\log\frac{255}{\left[\frac{1}{MNT}\sum_{t=1}^{T}\sum_{i=1}^{M}\sum_{j=1}^{N}[f(i,j,t)-\hat{f}(i,j,t)]^2\right]^{\frac{1}{2}}}$$

Where $f(i,j,t)$ is the pixel at location (i,j) in frame t of the original video sequence, $\hat{f}(i, j, t)$ is the co-located pixel in the decoded video sequence (at location (i,j) in frame t). M and N are frame width and height (in pixels), respectively. T is the total number of frames in the video sequence. Typically, the higher the PSNR, the higher visual quality is.

Current video coding schemes utilize motion estimation (ME), discrete cosine transform (DCT)-based transform and entropy coding to exploit temporal, spatial and data redundancy. Most of them conform to existing standards, such as the ISO/IEC MPEG-1, MPEG-2, and MPEG-4 standards, the ITU-T, H.261, H.263, and H.264 standards, and China's audio video standards (AVS) etc.

The ISO/IEC MPEG-1 and MPEG-2 standards are used extensively by the entertainment industry to distribute movies, in applications such as video compact disk or VCD (MPEG-1), digital video disk or digital versatile disk or DVD (MPEG-2), recordable DVD (MPEG-2), digital video broadcast or DVB (MPEG-2), video-on-demand or VOD (MPEG-2), high definition television or HDTV in the US (MPEG-2), etc. The later developed MPEG-4 is better in some aspects than MPEG-2, and can achieve high quality video at lower bit rate, making it very suitable for video streaming over internet digital wireless network (e.g. 3G network), multimedia messaging service (MMS standard from 3GPP), etc. MPEG-4 is accepted into the next generation high definition DVD (HD-DVD) standard and the multimedia messaging standard (MMS).

The ITU-T H.261/3/4 standards are widely used for low-delay video phone and video conferencing systems. The latest H.264 (also called MPEG-4 Version 10, or MPEG-4 AVC) is currently the state-of-the-art video compression standard. H.264 is a joint development of MPEG with ITU-T in the framework of the Joint Video Team (JVT), which is also called MPEG-4 Advance Video Coding (MPEG-4 AVC), or MPEG-4 Version 10 in the ISO/IEC standards. H.264 has been adopted in the HD-DVD standard, Direct Video Broadcast (DVB) standard and MMS standard, etc. China's current Audio Video Standard (AVS) is also based on H.264 where AVS 1.0 is designed for high definition television (HDTV) and AVS-M is designed for mobile applications.

H.264 has superior objective and subjective video quality over MPEG-1/2/4 and H.261/3. The basic encoding algorithm of H.264 is similar to H.263 or MPEG-4 except that integer 4×4 discrete cosine transform (DCT) is used instead of the traditional 8×8 DCT and there are additional features including intra prediction mode for I-frames, multiple block sizes and multiple reference frames for motion estimation/compensation, quarter pixel accuracy for motion estimation, in-loop deblocking filter, context adaptive binary arithmetic coding, etc.

Despite the great effort in producing higher quality digital signals, data processing itself introduces distortion or artifacts in the signals; digital video sequences are almost always corrupted by noise due to video acquisition, recording, processing and transmission. A main source of noise is the noise introduced by capture device (e.g. the camera sensors), especially when the scene is dark leading to low signal-to-noise ratio. If an encoded video is a noise-corrupted video, the decoded video will also be noisy, visually unpleasing to the audience.

SUMMARY

The present application discloses new approaches to digital data decoding. The decoding process includes denoising as an integral part of the processing.

Instead of performing the denoising filtering process as a separate part of the decoding process, the present application teaches a decoding system that takes into account the random noise generated by the capturing device and the system itself and outputs directly a denoised digital datastream, therefore producing higher quality digital media with minimal manipulation.

In one embodiment in accordance with this disclosure, the decoding process is embedded with a denoising functional module that conducts statistic analysis of the reconstructed data of the encoded input datastream, and minimizes data variances in data estimation.

In one embodiment, a temporal linear minimum mean square error (LMMSE) estimator is embedded with a video decoder, and the denoising filtering is simply to calculate the motion-compensated block residue coefficients on individual data blocks, therefore significantly reducing the complexity of computation involved in the denoising process.

In one embodiment, the reference value used in calculation of residue variance is a corresponding value from a prior digital sequence, i.e. the filtering is of causal type.

In another embodiment, the reference value used in calculation of residue variance is a corresponding value from a prior denoised digital sequence.

The disclosed innovations, in various embodiments, provide one or more of at least the following advantages:

Producing high quality datastream with much higher signal to noise ratio than traditional decoding schemes;
Increased performance and efficiency;
Reduced steps of data processing and system requirement;
More economical than traditional decoding and noise filtering system.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation). The appended paper entitled "Video Decoder Embedded with Temporal LMMSE Denoising Filter" by L. Guo etc. is also incorporated by reference.

Figure 1:
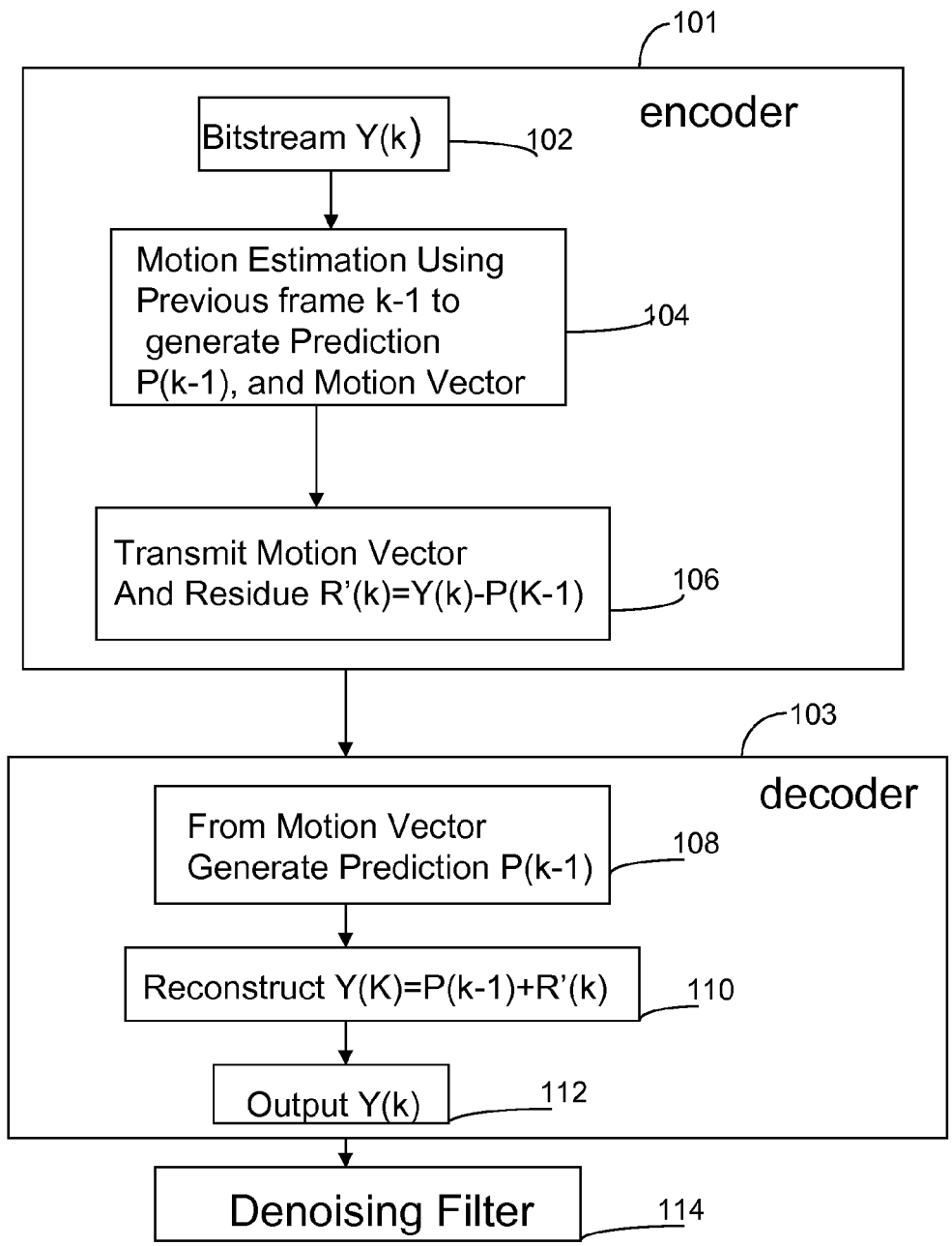
FIG. 1 shows a current general encoding/decoding process for digital video data.

FIG. 1 depicts the presently available general digital video data encoding and decoding process. In encoder 101, at step 102, bitstream signal Y(k) is an observed pixel value, or a block of pixel values (macroblock) from the current input frame k, while Y(k−1) is an observed bitstream signal of a corresponding reference pixel or macroblock in a prior frame, such as k−1, in time sequence. Encoder 101 performs motion estimation of Y(k) using certain corresponding digital values, in the same frame k, or in prior frames, such as k−1, as reference in calculation, and generates a prediction value P(k−1), and a motion vector (step 104). Encoder 101 also generates a motion-compensated residue value for this prediction R'(k)=Y(k)−P(k−1). Then the signals go through discrete cosine transformation (DCT) and quantization, being compressed via an entropy coding process to generate compressed bitstreams. The generated motion vector of each macroblock of each frame and its residue value along with the compressed bitstreams are stored or transmitted (step 106).

The predictions, motion vectors and residue values for a sequence of digital frames are received in decoder 103 (step 108). With entropy decoding, the DCT coefficients are extracted and inverse quantization and inverse DCT are applied to reconstruct the motion-compensated residue R'. Decoder 103 obtains the prediction value P(k−1) of the current pixel or block of pixels of frame k using the motion vector, reconstructs the observed digital value by adding the residue R'(k) to P(k−1) and outputs Y(k)=P(k−1)+R'(k) (step 110-112). The output Y(k) may not be of good quality because the original Y(k) may be noise contaminated, or the generated prediction P(k−1) and R'(k) may be noise contaminated, for which a further denoising filtration (step 114) may be required.

For example, if Xp(k) is a perfect pixel value in frame k and X(k) is the temporal prediction of the pixel; and since the observed value is corrupted by zero-mean noise N(k), and the noisy observed value Y(k) is:

$$Y(k)=Xp(k)+N(k) \quad (1)$$

If P(k−1) is used for the temporal prediction of Xp(k) and R(k) is temporal innovation:

$$Xp(k) = P(k-1) + R(k) \quad (2)$$

$$R(k) = Y(k) - P(k-1) - N(k) \quad (3)$$
$$= R'(k) - N(k)$$

In the equation, R(k) is assumed to be independent of noise N(k). The residue R'(k) needs to be corrected against noise N(k) to represent R(k).

Figure 2:
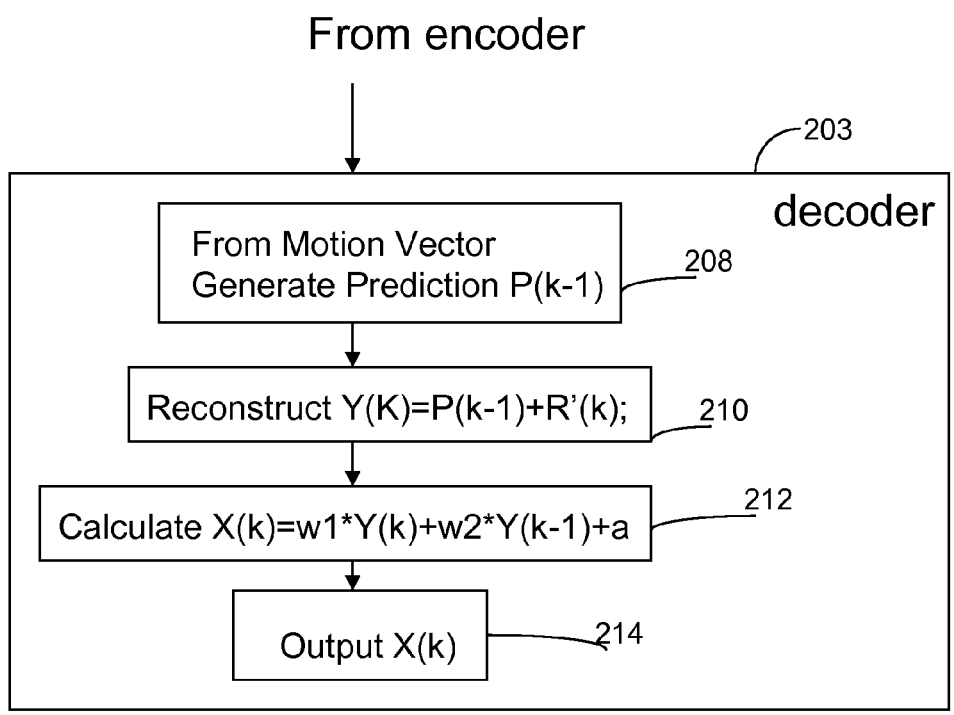
FIG. 2 shows one example of the non-recursive denoising in the decoding process in accordance with this application.

Let X(k) be the bitstream value of the current denoised block of pixels, FIG. 2 shows a process of a non-recursive approach to calculate X(k), where it is assumed that P(k−1)=Y(k−1). Since the measured Y(k) and estimated Prediction can be affected by noise, using temporal LMMSE model, a weight and constant are used to estimate the effect, and equation (3) is expressed as (4):

$$R(k) = w1 * R'(k) + a \quad (4)$$
$$= w1 * (Y(k) - P(k-1)) + a$$

Assume the denoised output is roughly the same as the perfect data value, X(k)=Xp(k); then X(k)=P(k−1)+R(k)

$$X(k) = P(k-1) + w1*(Y(k) - P(k-1)) + a \quad (5)$$
$$= w1*Y(k) + (1-w1)*P(k-1) + a$$
$$= w1*Y(k) + w2*P(k-1) + a$$
$$= w1*Y(k) + w2*Y(k-1) + a$$

where $w1 + w2 = 1$.

For temporal LMMSE model, the optimal coefficients to have the smallest estimation error are:

$$w1 = \frac{\sigma_n^{-2}}{\sigma_r^{-2} + \sigma_n^{-2}}; \quad (6)$$

$$a = (1 - w1)*\overline{R}. \quad (7)$$

where $\sigma_n^2$ is variance of N(k); $\sigma_r^2$ is variance of R(k) which is estimated by subtracting square variance of R'(k) with square variance of noise of the reference frame; $\overline{R}$ is the mean of R(k) which equals to the mean of R'(k) since N(k) has zero mean.

At step 212, to simplify the calculation, assuming P(k−1)=Y(k−1), the bitstream of value X(k)=w1*Y(k)+w2*Y(k−1)+a is outputted.

Figure 3:
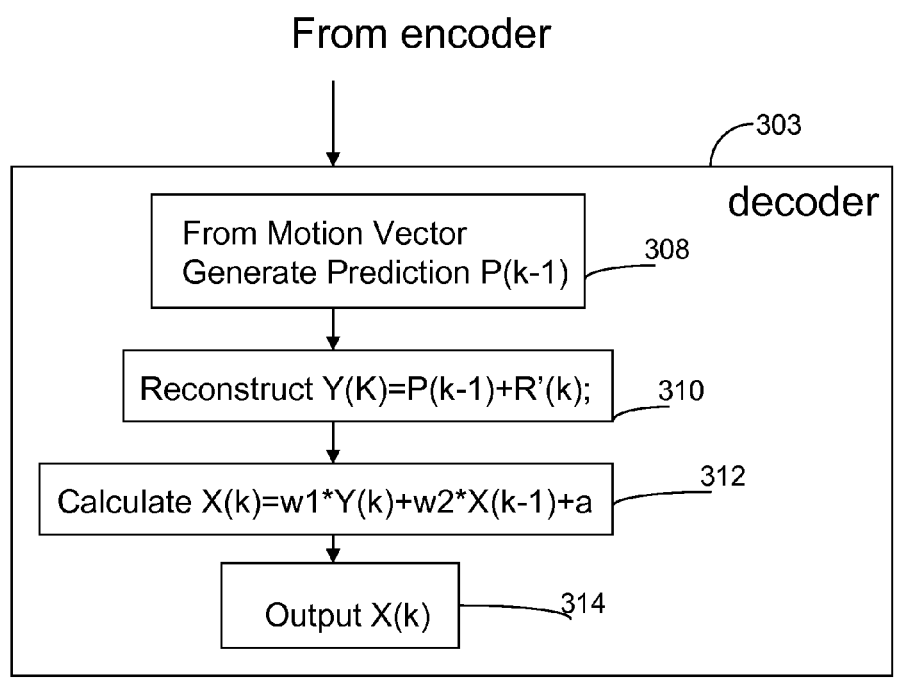
FIG. 3 shows one example of the recursive denoising in the decoding process in accordance with this application.

FIG. 3 shows a process of a recursive approach where R'(k) is also modified by adding a drift error (Y(k−1)−X(k−1)) in which X(k−1) is the previously denoised output value of reference frame k−1 while Y(k−1) is the noisy observed raw value.

$$R1'(k)=R'(k)+Y(k-1)-X(k-1) \quad (8)$$

Since the measured Y(k) and estimated Prediction can be affected by the noise, using temporal LMMSE model, a weight and constant are used to estimate the effect, and equation (8) is expressed as (9):

$$R(k) = w1*R1'(k) + a \quad (9)$$
$$= w1*(R'(k) + Y(k-1) - X(k-1)) + a$$

Assuming Y(k−1)=P(k−1) and equation (9), equation (2) can be expressed as:

$$X(k) = X(k-1) + w1*(R'(k) + Y(k-1) - X(k-1)) + a \quad (10)$$
$$= X(k-1) + w1*(Y(k) - Y(k-1) + Y(k-1) - X(k-1)) + a$$
$$= w1*Y(k) + (1-w1)*X(k-1) + a$$

In order to calculate the drift error and R1'(k), two previous reference frames need to be stored in the reference frame buffer, one is the noisy reference, one is the denoised reference.

Figure 4:
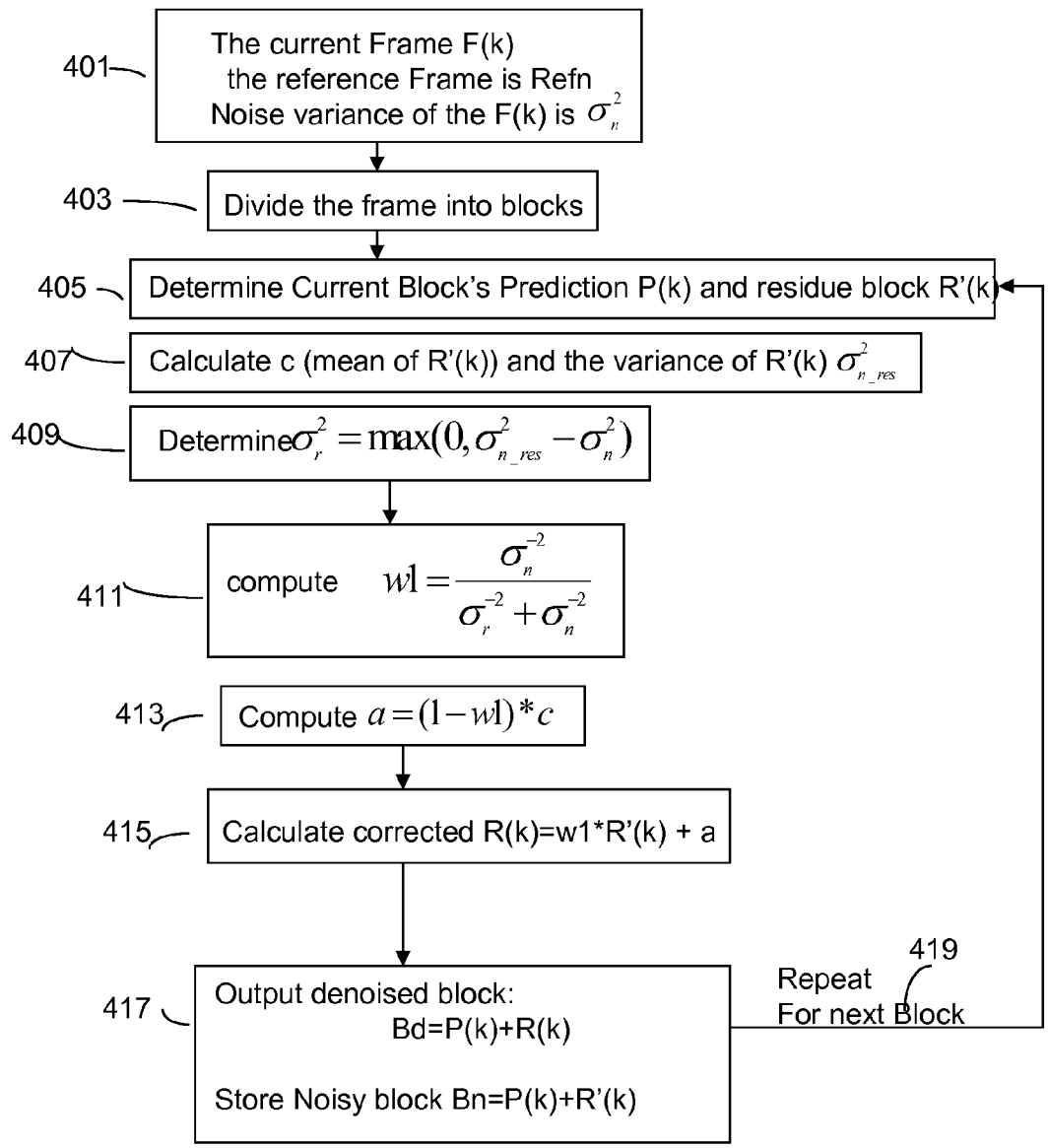
FIG. 4 shows one example of the non-recursive computing procedure of the decoding process in accordance with this application.

FIG. 4 shows an example the decoding processing using the non-recursive approach.

First at step 401 the current frame to be decoded is the k-th frame F(k) which has a noise variance $\sigma_n^2$ and the reference frame is one of the undenoised reconstructed prior frames Refn. At step 403, Frame F(k) is divided into blocks (macroblock) according the configuration or encoding information.

At step 405, the prediction P(k) of the current block is determined from the reference frame and the residue block R'(k) is calculated according to the standard procedures. At step 407, the mean of R'(k) is calculated as c and the variance of R'(k), i.e. $\sigma_{n\_res}^2$ is calculated using standard statistic procedure.

At step 409, $\sigma_r^2$=max (0,$\sigma_{n\_res}^2-\sigma_n^2$) is determined; from steps 411-415, the system calculates $$w1 = \frac{\sigma_n^{-2}}{\sigma_r^{-2} + \sigma_n^{-2}} \text{ and } a = (1-w1)*c.$$

Therefore the estimated innovation from the prediction of the current block is R(k)=w1*R'(k)+a (step 415). At step 417, the denoised signal of the current block Bd=P(k)+R(k) is outputted; and both the noisy block Bn=P(k)+R'(k) and Bd are stored for other calculations. But storage of Bd is optional and may not be necessary. At step 419, the processing unit proceeds to process the next residue block of frame k, and if there is no more blocks, proceeds to next frame.

Figure 5:
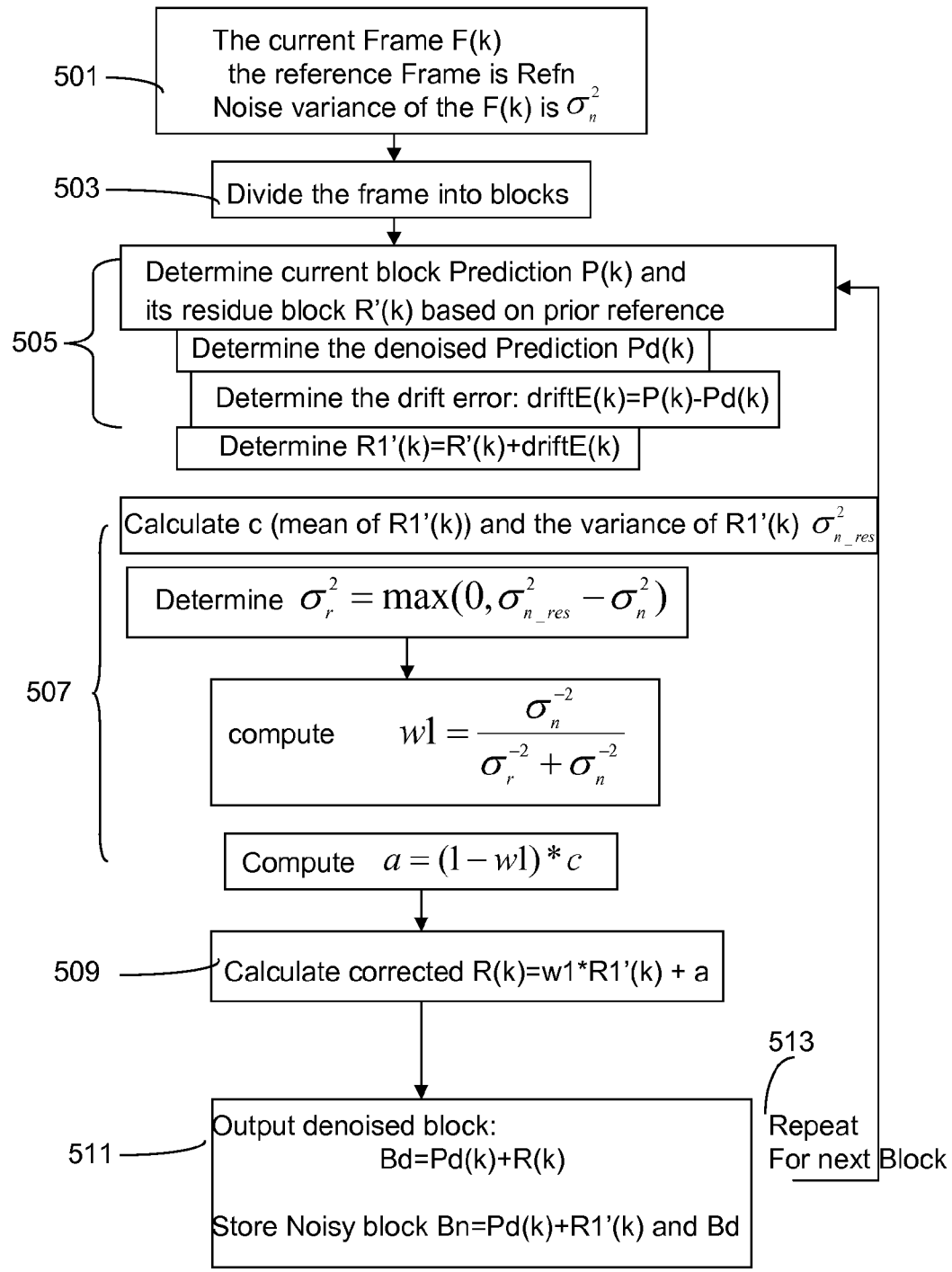
FIG. 5 shows one example of the recursive computing procedure of the decoding process in accordance with this application.

FIG. 5 shows an example of processing using the recursive approach.

First at step 501, the current frame to be processed is the k-th frame F(k) which has a noise variance $\sigma_n^2$. At step 503, the frame k is divided into plurality of blocks. At step 505, a reference block is chosen from the buffer, its undenoised original digital value is P(k) and denoised digital value is Pd(k), and they are treated as the prediction of the current block in processing. Then a drift error is calculate (driftE(k)=P(k)−Pd(k)) and the residue block is modified to be R1'(k)=R'(k)+driftE(k).

Then at step 507, the mean of R1'(c) and variance $\sigma_{n\_res}^2$ is calculated based on the reference. Determine $\sigma_r^2$= max(0,$\sigma_{n\_res}^2-\sigma_n^2$) and calculate $$w1 = \frac{\sigma_n^{-2}}{\sigma_r^{-2} + \sigma_n^{-2}} \text{ and } a = (1-w1)*c.$$

Therefore the estimated innovation from the prediction of the current block is R(k)=w1*R1'(k)+a (step 509). At step 511, the denoised signal of the current block Bd=Pd(k)+R(k) is outputted; and both the noisy block Bn=Pd(k)+R1'(k) and Bd are stored for next calculations. At step 513, the processing unit proceeds to process the next residue block of frame k, and if there is no more blocks, proceeds to next frame.

The denoising-including decoding unit is designed to run within various software and hardware implementations of MPEG-1, MPEG-2, MPEG-4, H.261, H.263, H.264, AVS, or related video coding standards or methods. It can be embedded in digital video broadcast systems (terrestrial, satellite, cable), digital cameras, digital camcorders, digital video recorders, set-top boxes, personal digital assistants (PDA), multimedia-enabled cellular phones (2.5 G, 3 G, and beyond), video conferencing systems, video-on-demand systems, wireless LAN devices, bluetooth applications, web servers, video streaming server in low or high bandwidth applications, video transcoders (converter from one format to another), and other visual communication systems, etc.

Both software and hardware solutions can implement the novel process steps. In one embodiment, a software-based solution is provided as an extension to an existing operating decoder. In another embodiment, a combination hardware and software-based solution integrates the novel processes to provide higher quality of the multi media streams. The system can also be configurable and adapt to different existing system configurations.

Computer readable medium may include any computer processor accessible medium, for example, computer hard drives, CDs, memory cards, flash cards, diskettes, tapes, virtual memory, iPod, camera, digital electronics, game kiosks, cell phones, music players, DVD players, etc.

Experiments have been conducted to evaluate the performance of the presented denoising-embedded decoder. Three CIF test sequences, Akiyo, Foreman and Table Tennis, are used. Gaussian noises with variance 49 and 100 are added to the luminance components of these sequences. These sequences are encoded using H.264 reference encoder JM 8.2 at various QPs. The first frame is I frame, and the rest are P frames. Both the non-recursive and recursive denoising-embedded decoding schemes are used to decode the encoded noisy video. For comparison, a regular H.264 decoder is also used to decode these encoded bitstreams. The quality of the decoded videos is measured in terms of PSNR, which is calculated with respect to the uncompressed clean video sequences.

Figure 6:
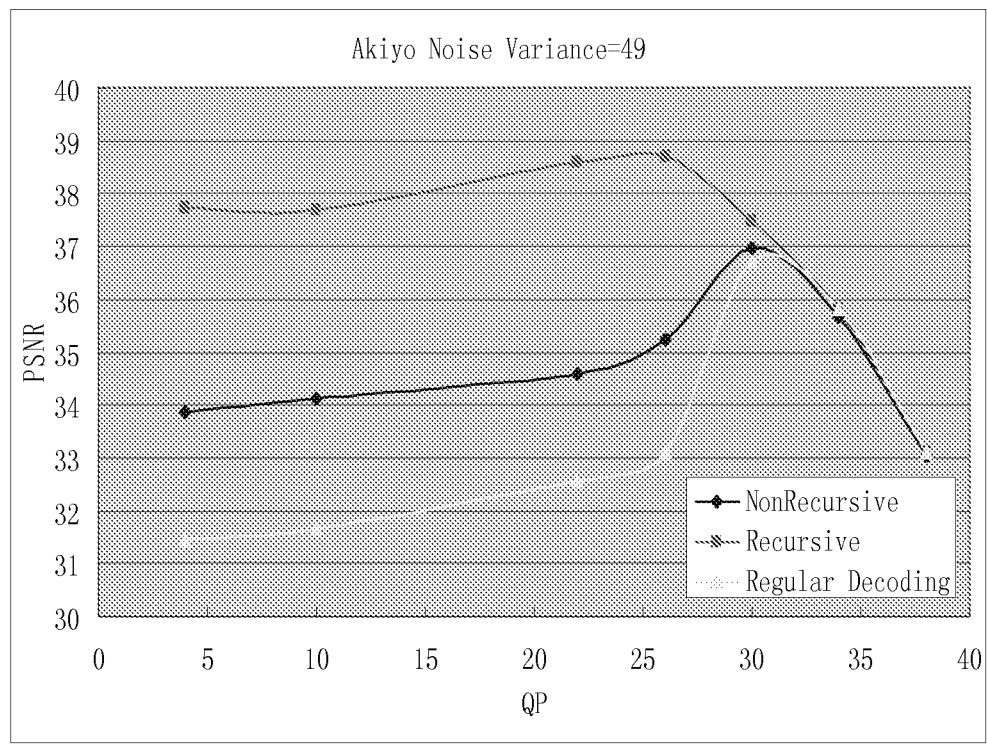
FIG. 6 shows one example of simulation results of the decoding process in accordance with this application.
Figure 7:
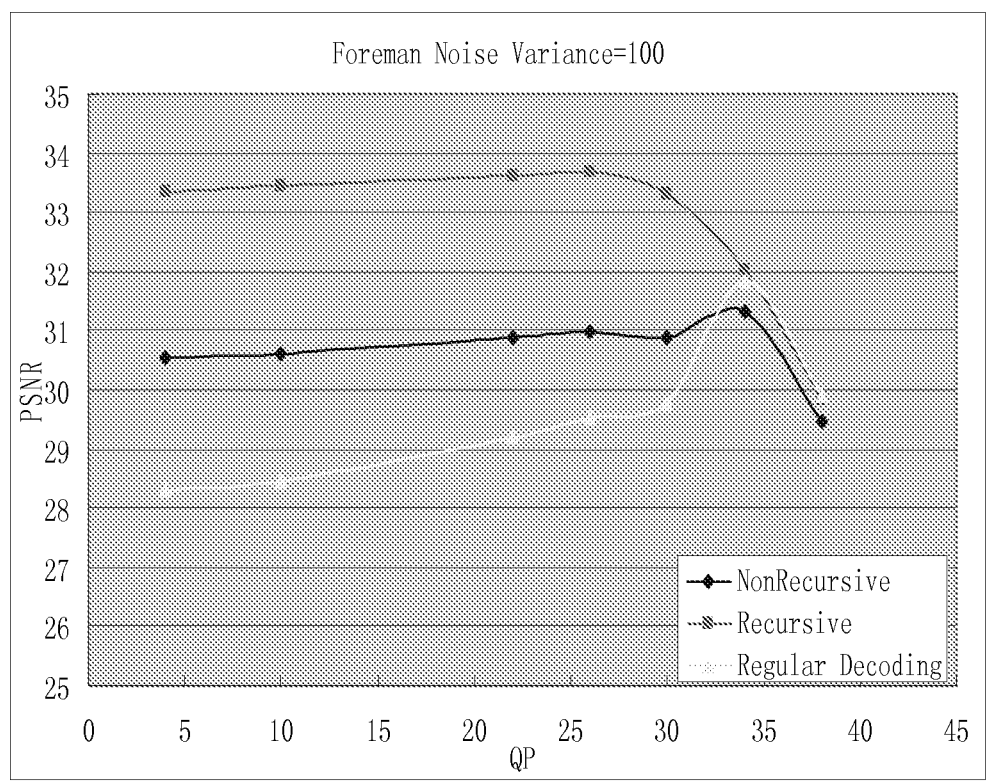
FIG. 7 shows another example of simulation results of the decoding process in accordance with this application.
Figure 8:
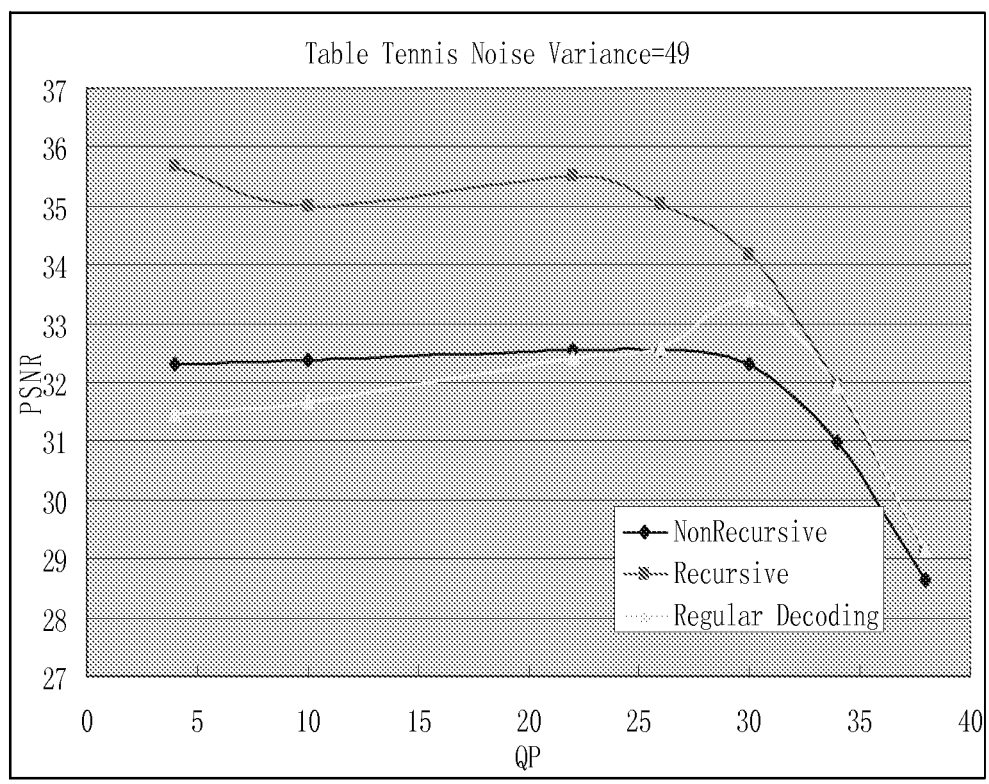
FIG. 8 shows another example of simulation results of the decoding process in accordance with this application.

The PSNR of the above mentioned video sequences decoded by nonrecursive, recursive denoising-embedded decoding approaches and by regular decoding are compared in FIGS. 6, 7 and 8. The denoising-embedded decoding process significantly improved the quality of the decode video, especially at the small or middle quality parameters (QPs) although when a large QP is used the performances of these three schemes are similar. Nevertheless, the recursive approach generally showed a significant better performance than the other two approaches.

Figure 9:
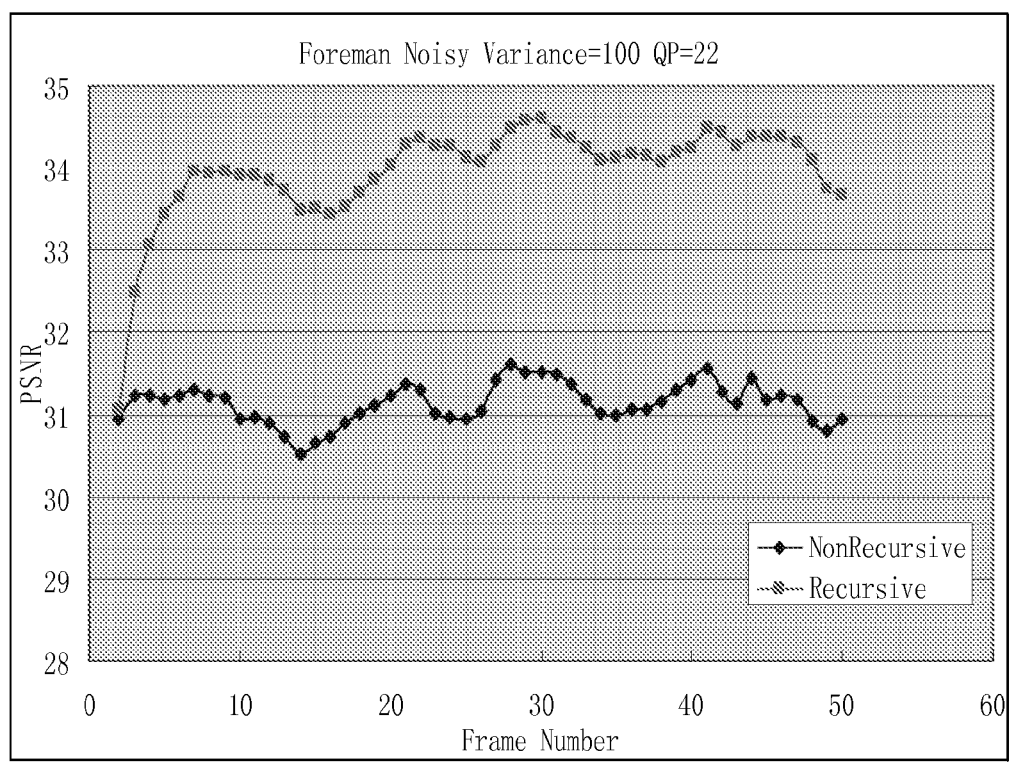
FIG. 9 shows a performance comparison of the simulation results of the decoding process in accordance with this application.

In FIG. 9, the PSNRs for every frame of a decoded video sequence using the recursive and non-recursive approaches are compared. Although the recursive scheme and the non-recursive scheme produced the same PSNR for the first frame, the recursive approach generated a much higher PSNR images for the later frames. The recursive approach demonstrates characteristics of a typical M-tap filter, where M is the number of previously denoised frames, and the decoding performance increases with the number of previously denoised frames.

Figure 10:
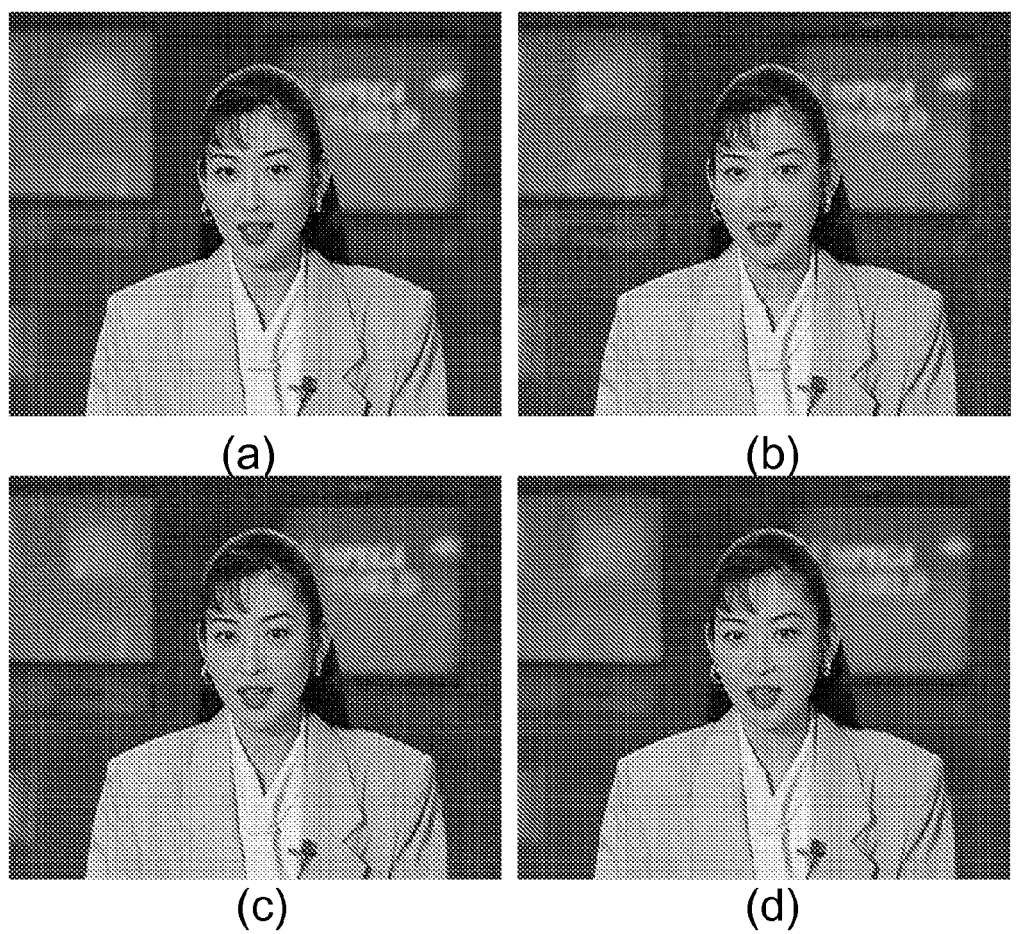
FIG. 10 shows an example of subjective quality of a simulation of the decoding process in accordance with this application.
Figure 11:
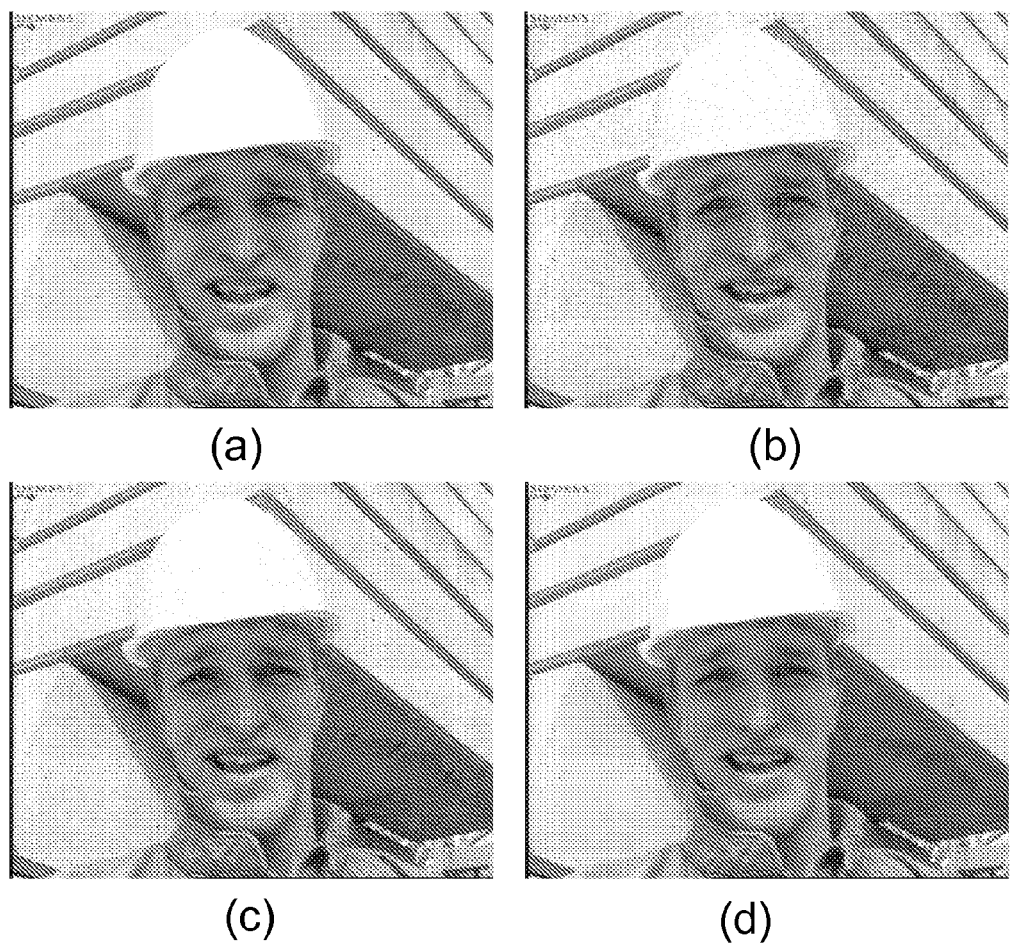
FIG. 11 shows an example of subjective quality of a simulation of the decoding process in accordance with this application.

FIG. 10 and FIG. 11 compare the subjective quality of the decoded video using the various decoding approaches.

FIG. 10 is a Foreman video image frame; (a) uncompressed clean video signal. For (b)-(d), the video signals are first corrupted by a noise having a variance of 100. Signals are then encoded and encoded signals are used for decoding. (b) decoded by regular decoder, (c) decoded by the non-recursive method and (d) decoded by the recursive method. (c) and (d) shows a higher subjective quality and (d) is much closer to the original non-corrupted image as shown in (a).

FIG. 11 is an Akiyo image frame; (a) uncompressed clean video sequence. For (b)-(d), the signals are first corrupted by addition of a noise having a variance of 49. Signals are then encoded and encoded signals are used for decoding. (b) decoded by regular decoder, (c) decoded by the non-recursive approach and (d) decode by the recursive approach. The visual quality improvement of recursive approach is more significant than that of non-recursive approach.

The embedded temporal LMMSE denoising-including decoding approach therefore preserves the most spatial details, and even the edges of the image remain sharp.

Figure 12:
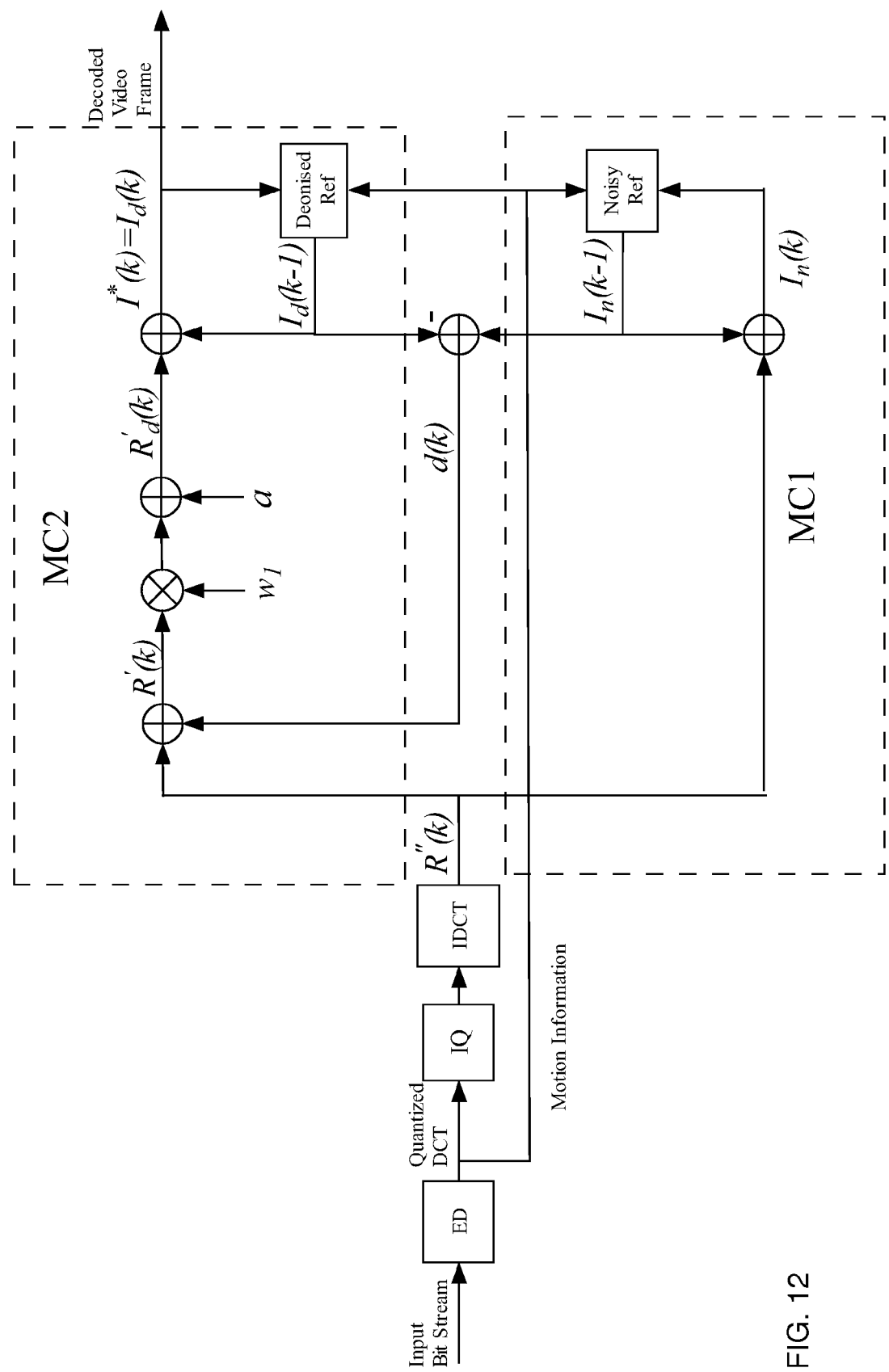
FIG. 12 shows an example of a hybrid video decoder with integral denoising.

FIG. 12 shows an example of a hybrid video decoder with integral denoising.

An example architecture is shown in FIG. 12. This embodiment has two motion compensation (MC) modules, i.e., MC1 and MC2, and each of them has its own reference frame buffer, i.e., Noisy Ref and Denoised Ref, respectively. MC1 is as the same as that of a regular video decoder. The video signal stored in Noisy Ref is the undenoised reference frame and thus the temporal prediction is noisy pixel In(k−1). The received motion-compensated residue R"(k) which equals In(k)−In(k−1) is added to In(k−1) and the noisy video In(k) is reconstructed. MC2 is an innovative module. For MC2, the video signal stored in the reference frame buffer, is not noisy video In(k−1) but denoised video Id(k−1). The proposed scheme first computes the difference between the prediction from Noisy Ref In(k−1) and Denoised Ref Id(k−1) wherein d(k)=In(k−1)−Id(k−1).

Afterwards, d(k) is added to the received residue R"(k). It is easy to see that the derived signal is R'(k), which is the residue corresponding to denoised prediction Id(k−1), $$R'(k) = In(k) - Id(k-1)$$
$$= (In(k) - In(k-1)) + (In(k-1) - Id(k-1))$$
$$= R''(k) + d(k)$$

Simple linear corrective operations (multiplication with w followed by addition with a) are then applied to R'(k) to generate a denoised residue Rd(k) where Rd(k)=wR'(k)+a and the modified residue Rd(k) is added to Id(k−1) as the decoding output of the proposed scheme I*(k)=Id(k−1)+Rd(k). Since I*(k)=Id(k), which suggests that the pre-described temporal LMMSE denoising filtering is embedded into the decoding process and the output is denoised pixel Id(k).

According to various embodiments, there is provided: a method for decoding digital signals, comprising the actions of: receiving an input digital signal which is encoded; estimating the noise and signal statistics of said digital signal and decoding said digital signal using motion compensation which references denoised reference blocks; and accordingly outputting a decoded and denoised digital signal.

According to various embodiments, there is provided: a method for decoding digital signals, comprising the actions of: receiving an input digital signal which is encoded; estimating the noise and signal statistics of said digital signal and decoding said digital signal, using two motion compensation operations; wherein said two motion compensation operations use different respective reference frames which are differently denoised; wherein said statistics is used to produce and output a decoded and denoised digital signal, wherein said correction coefficient is calculated by using a causal temporal linear minimum mean square error estimator (LMMSE); wherein said action of modifying includes combined weighted linear modifications of said digital signal and weighted linear modification of said prediction using said correction coefficient.

According to various embodiments, there is provided: a digital video method, comprising the actions of: encoding a video stream to thereby produce a digital video signal; receiving said digital video signal which is encoded; decoding said digital signal using motion compensation which references denoised reference blocks; and accordingly outputting a decoded and denoised digital signal.

According to various embodiments, there is provided: a decoder for video signals, comprising: a decompressing module which reconstructs prediction of encoded block of pixels; and a denoising module which estimates a noise variance and signal statistics of said block of pixels and calculates a correction coefficient based said noise variance and said statistics, and modifies said prediction using said correction coefficient, whereby said decoder outputs a decoded and denoised block of pixels.

According to various embodiments, there is provided: a digital video system, comprising: an encoder that has an embedded denoising module, wherein the denoising process is an integral part of the encoding process; and a decoder that has an embedded denoising module, wherein the denoising process is an integral part of the decoding process, wherein said encoder further comprises a compressing module which performs motion compensation and wherein said denoising module calculates signal statistics and noise variance of an input digital signal, and generates a denoised motion vector which contains information for a prediction value of an input digital video signal; and said decoder further comprises a decoding module which decodes an encoded digital signal to produce a prediction for said digital signal and its said denoising module calculates a signal statistics and noise variance of the encoded digital signal, and generates a decoded and denoised digital video signal.

According to various embodiments, there is provided: a method for decoding digital video signals, comprising the actions of: receiving a current encoded bitstream of a video pixel; decoding said encoded bitstream to produce a frame as the reference frame for future decoding; estimating some noise and signal statistics of said current video signal, and use the said noise and signal statistics to calculate correction coefficients to modify the said received residue and output the superimposition of the said reconstructed residue blocks and the said prediction found in the previous output of the processing unit frame for display; wherein said action of decoding further comprising the actions of: determining one or more predictions value of the current pixel from one or more reference pixels in said processing unit; determining the noise and pixel statistics of said current pixel and the said reference pixels; calculating correction coefficients based on the noise and pixel statistics; and producing a denoised pixel value by combining the said current pixel and the said predictions with said correction coefficients.

According to various embodiments, there is provided: A method for decoding digital video signals, comprising the actions of: receiving a current encoded bitstream of a video pixel; decoding said encoded bitstream to produce a frame as the reference frame for future decoding; estimating some noise and signal statistics of said current video signal, and use the said noise and signal statistics to calculate correction coefficients to modify the said received residue and output the superimposition of the said reconstructed residue blocks and the said prediction found in the reference frame of the said decoding unit for display; wherein said action of decoding further comprising the actions of: determining one or more predictions value of the current pixel from one or more reference pixels in said processing unit; determining the noise and pixel statistics of said current pixel and the said reference pixels; calculating correction coefficients based on the noise and pixel statistics; and producing a denoised pixel value by combining the said current pixel and the said predictions with said correction coefficients.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In the disclosed system, the reference block may come from one reference frame where the prediction is a block from one previously reconstructed frame. The disclosed system also can process video encoded with overlapped block motion compensated (the prediction is a weighted averaging of several neighboring blocks in the reference frame), intra prediction (prediction is the pixel values of some neighboring blocks in the current frame), multihypothesis prediction (the prediction is the weighted averaging of multiple blocks from different frames) or with weighted prediction (the prediction is a scaled and offset version of a block in the reference frame).

Frames may be divided into different blocks having same or different sizes, and of different shapes, such as triangular, hexagonal, irregular shapes, etc. The blocks can be disjoint or overlapped, and the block may only contain 1 pixel.

Any previously denoised frame may be used for estimation of the prediction value of the current frame. The denoising method can be spatial denoising, temporal denoising, spatio-temporal denoising, pixel-domain denoising, transform domain denoising, or possible combinations thereof. The denoising methods can also be the combinations of the disclosed approach and any other proposed methods in the publications.

In recursive-approach, Prediction value comes from a block in REFn that is pointed by the motion vector of the current block. Pd can come from the co-located block of P in REFde, or can be a block at a different location. The location of Pd can be determined using block-based motion estimation, optical flow or even manually inputted.

Parameter $\sigma_r^2$ can be generalized as $\sigma_r^2 = f(\sigma_{n\_res}^2, \sigma_n^2)$, where $f$ is a function of $\sigma_{n\_res}^2$ and $\sigma_n^2$ to achieve more accurate parameter estimation in practice.

The present invention provides simple and effective noise suppression techniques for various video processing systems, especially for MPEG-1, MPEG-2, MPEG-4, H.261, H.263, H.264 or AVS or related video coding. The temporal denoising process is seamlessly incorporated into the decoding process, with only simple linear operations on individual residue coefficients. The filter coefficients are determined based on linear minimum mean error estimator which provides a high denoising performance.

Additional general background, which helps to show variations and implementations, may be found in the following publications, all of which are hereby incorporated by reference:

[1] Joint Video Team of ITU-T and ISO/IEC JTC 1, "Draft ITU-T Recommendation and Final Draft International Standard of Joint Video Specification (ITU-T Rec. H.264|ISO/IEC 14496-10 AVC)," document JVT-GO50r1, May 2003.

[2] A. Amer and H. Schroder, "A new video noise reduction algorithm using spatial sub-bands", in Proc. IEEE Int. Conf. Elecron., Circuits, Syst., vol. 1, Rodos, Greece, October 1996, pp 45-48.

[3] B. C. Song, and Chun, K. W. "Motion-Compensated Noise Estimation For Efficient Pre-filtering in a Video Encoder." in Proc. of IEEE Int. Conf. on Image Processing, vol. 2, pp. 14-17, September 2003

[4] J. Woods and V. Ingle, "Kalman filter in two dimensions: Further results" IEEE Trans. Acoustics Speech Signal Processing, vol. ASSP-29, pp. 188-197, 1981.

[5] O. C. Au, "Fast ad-hoc Inverse Halftoning using Adaptive Filtering", in Proc. of IEEE Int. Conf. on Acoustics, Speech, Signal Processing, vol. 6, pp. 2279-2282, March 1999

[6] T. W. Chan, Au, O. C., T. S. Chong, W. S. Chau, "A novel content-adaptive video denoising filter," Proc. ICASSP, 2005

[7] D. L. Donoho, "Denoising by soft-thresholding" in IEEE Trans. Inform. Th. 41, pp. 613-627, May 1995.

[8] S. Zhang, E. Salari, "Image denoising using a neural network based non-linear filter in wavelet domain," Proc. ICASSP, 2005

[9] N. Rajpoot, Z. Yao, R. Wilson, "Adaptive wavelet restoration of noisy video sequences," Proc. ICIP., 2004

[10] A. J. Patti, A. M. Tekalp, M. I. Sezan, "A new motion-compensated reduced-order model Kalman filter for space-varying restoration of progressive and interlaced video," IEEE Trans. Image Processing. Vol. 4, pp. 543-554, September 1998

[11] J. C. Brailean, R. P. Kleihorst, S. Efstratiadis, A. K. Katsaggelos and R. L. Lagendijk, "Noise Reduction Filters for Dynamic Image Sequences: A Review," Proc. IEEE, vol. 83, no. 9, pp. 1272-1292, September 1995

[12] JVT reference software JM8.3 for JVT/H.264.

[13] B. C. Song, and K. W. Chun, "Motion compensated temporal filtering for denoising in video encoder," Electronics Letters Vol. 40, Issue 13, pp 802-804, June 2004

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for decoding digital signals, comprising:
   receiving an encoded digital signal;
   estimating a signal statistic of the encoded digital signal; and
   decoding the encoded digital signal by a decoder including a filter based at least in part on the signal statistic and a difference between a first version of a reference frame that is not denoised and a second version of the reference frame that is denoised by the filter included in the decoder.

2. The method of claim 1, wherein the estimating the signal statistic includes averaging noise variances of previously decoded reference frames.

3. The method of claim 2, wherein the decoding further includes:
   determining a first prediction value for the encoded digital signal using the first version of the reference frame and a second prediction value for the digital signal using the second version of the reference frame;
   calculating a correction coefficient using the noise variances and the signal statistic; and
   modifying the first prediction value and the second prediction value using the correction coefficient to thereby produce a decoded digital signal.

4. The method of claim 3, wherein the determining the second prediction value includes averaging multiple blocks in the second version of the reference frame.

5. The method of claim 3, wherein the second version of the reference frame is received from a reference frame buffer.

6. The method of claim 3, wherein the calculating includes calculating the correction coefficient using a causal temporal linear minimum mean square error estimator (LMMSE).

7. The method of claim 6, wherein the modifying includes modifying the encoded digital signal based on a weighted linear combination of the first prediction value, the second prediction value and the correction coefficient.

8. The method of claim 1, further comprising receiving the first version of the reference frame from a first reference frame buffer in a first motion compensation module and receiving the second version of the reference frame from a second reference frame buffer in a second motion compensation module.

9. The method of claim 1, further comprising modifying a residue block received from the encoded digital signal based at least in part on the signal statistic.

10. The method of claim 9, wherein the modifying includes modifying the residue block based at least in part on the difference between the first version of the reference frame and the second version of the reference frame.

11. A method for decoding digital video signals, comprising
   receiving an encoded bitstream that includes a video pixel;
   calculating a signal statistic and a noise statistic of the video pixel; and
   decoding the video pixel by a decoder associated with denoising filtering based at least in part on the signal statistic, the noise statistic and a difference between a first version of a reference frame that is not denoised and a second version of the reference frame that is denoised by the decoder associated with the denoising filtering.

12. The method of claim 11, wherein the calculating includes averaging noise variances of previously decoded pixels in the first version of the reference frame.

13. The method of claim 12, wherein the decoding includes:
   determining a first prediction value of the video pixel using the first version of the reference frame and a second prediction value of the video pixel using the second version of the reference frame;
   calculating a correction coefficient using the noise variances and the signal statistic; and
   modifying the first prediction value and the second prediction value using the correction coefficient, thereby producing a decoded video pixel.

14. The method of claim 13, wherein the determining the second prediction value includes averaging blocks of pixels from different reference frames.

15. The method of claim 13, wherein the second version of the reference frame includes a previously denoised pixel or a block of previously denoised pixels.

16. The method of claim 13, wherein the first version of the reference frame includes denoised pixels and non-denoised pixels.

17. The method of claim 13, wherein the calculating the correction coefficient includes calculating the correction coefficient using a causal temporal linear minimum mean square error estimator (LMMSE).

18. The method of claim 17, wherein the modifying includes linearly combining the first prediction value, the second prediction value and the correction coefficient.

19. A method for decoding digital signals, comprising:
receiving an encoded digital signal;
estimating a first statistic associated with noise of the encoded digital signal and a second statistic associated with the first statistic; and
decoding the encoded digital signal by a decoder including a denoising filter based at least in part on the first statistic, the second statistic and a difference between a first version of a reference block that is not denoised and a second version of the reference block that is denoised by the denoising filter included in the decoder.

20. The method of claim 19, wherein the second statistic is generated based at least in part on the first statistic.

* * * * *